United States Patent [19]

Strand

[11] Patent Number: 5,070,176

[45] Date of Patent: Dec. 3, 1991

[54] MELT PHASE POLYARYLATE PROCESS

[75] Inventor: Marc A. Strand, Kingsport, Tenn.

[73] Assignee: Eastman Kodak Company, Rochester, N.Y.

[21] Appl. No.: 586,181

[22] Filed: Sep. 21, 1990

[51] Int. Cl.[5] ................................................ C08G 63/62
[52] U.S. Cl. ..................................... 528/194; 528/179
[58] Field of Search ................ 528/176, 179, 194, 182

[56] References Cited

U.S. PATENT DOCUMENTS 4,485,230  11/1984  Yu .......................................... 528/125

OTHER PUBLICATIONS

Macromolecules 1989, 22, 1074–1077.

Primary Examiner—Harold D. Anderson
Assistant Examiner—T. Mosley
Attorney, Agent, or Firm—Charles R. Martin; Wm. P. Heath, Jr.

[57] ABSTRACT

Disclosed is a process for preparation of a polyarylate having a degree of polymerization of at least 50 by polymerizing an admixture comprised of 4-dialkylaminopyridine, an acid anhydride, bisphenol-A and a mixture of isophthalic acid and terephthalic acid by the steps of (1) subjecting the admixture to a pressure in the range of 500 to 1400 mm of Hg and a temperature in the range of 20° to 150° C. while maintaining a degree of polymerization of substantially 1.0, (2) subjecting the admixture to a pressure in the range of 500 to 1400 mm of Hg and a temperature in the range of 285° to 350° C. to achieve a degree of polymerization in the range of 2 to 7, (3) subjecting the admixture to a pressure in the range of 100 to 400 mm of Hg and a temperature in the range of 285° to 350° C. to achieve a degree of polymerization in the range of 7 to 15, (4) subjecting the admixture to a pressure in the range of 100 to 400 mm of Hg and a temperature in the range of 330° to 400° C. to achieve a degree of polymerization in the range of 7 to 15, and (5) subjecting the admixture to a pressure in the range of 10 to 75 mm of Hg and a temperature in the range of 330° to 400° C. to achieve an degree of polymerization of at least 50.

2 Claims, No Drawings

MELT PHASE POLYARYLATE PROCESS

This invention relates to a melt phase process for preparation of a polyarylate.

Many processes have been reported in the literature for preparation of polyarylates. For example, it is well known that polyarylates can be prepared by preparing an admixture of an anhydride, a bisphenol and a dicarboxylic acid and then heating the admixture. Initially the anhydride reacts with the bisphenol to form the diester of the phenol and the diester subsequently polymerizes with the dicarboxylic acid in the melt to form a low molecular weight polymer. The low molecular weight polymer can then be built up in the melt to a high molecular weight polymer having useful properties.

Preparation of a specific polyarylate using a preformed diester and 4-dimethylaminopyridine is disclosed in *Macromolecules* 1989, 22, 1065–1074.

U.S. Pat. No. 4,485,230 discloses a process for preparing polyarylates in the melt by heating a bisphenol, an aromatic dicarboxylic acid and acetic anhydride.

This invention is an improvement over the processes of the prior art. The improvement comprises a series of polymerization steps which involve particular temperature and pressure ranges and limitations as to the degree of polymerization achieved during each step. Carefully observing this sequence of steps as well as the pressure and temperature ranges for each step as well as the limitations regarding the degree of polymerization for each step results in a more economical process for the preparation of polyarylate.

Broadly this process can be described as a process for preparation of a polyarylate having a degree of polymerization of at least 50 comprising (A) forming an admixture comprised of 4-dialkylaminopyridine, an acid anhydride prepared from an aliphatic carboxylic acid which contains from 2 to 6 carbon atoms, bisphenol-A and a mixture of isophthalic acid and terephthalic acid wherein the range of isophthalic acid is 20 to 100 mole percent and the range of terephthalic acid is 80 to 0 mole percent, and (B) polymerizing the admixture by
  (1) subjecting the admixture to a pressure in the range of 500 to 1400 mm of Hg and a temperature in the range of 20° to 150° C. while maintaining a degree of polymerization of substantially 1.0,
  (2) subjecting the admixture to a pressure in the range of 500 to 1400 mm of Hg and a temperature in the range of 285° to 350° C. to achieve an degree of polymerization in the range of 2 to 7,
  (3) subjecting the admixture to a pressure in the range of 100 to 400 mm of Hg and a temperature in the range of 285° to 350° C. to achieve an degree of polymerization in the range of 7 to 15,
  (4) subjecting the admixture to a pressure in the range of 100 to 400 mm of Hg and a temperature in the range of 330° to 400° C. to achieve an degree of polymerization in the range of 7 to 15, and
  (5) subjecting the admixture to a pressure in the range of 10 to 75 mm of Hg and a temperature in the range of 330° to 400° C. to achieve an degree of polymerization of at least 50.

The 4-dialkylaminopyridine functions as a catalyst. The alkyl group can be straight chain or branched and can contain from 1 to 7 carbon atoms or the two alkyl groups can be connected together to give a cycloaliphatic group. Methyl and ethyl are preferred with methyl being most preferred. The amount of the catalyst is not critical but can vary from 0.01 to 1.0 mol % with from 0.07 to 0.2 mol % being preferred.

The acid anhydride useful in this invention is derived from an aliphatic carboxylic acid which contains from 2 to 6 carbon atoms. Examples include acetic anhydride, propionic anhydride, butyric anhydride, pentanoic anhydride and the like. Acetic anhydride is most preferred because of ease of use. Propionic anhydride will make less colored material.

The amount of anhydride which may be used in the process of the invention may vary from a stoichiometric amount to a substantial molar excess, but less than 10 and preferably less than 5% molar excess is preferred in order to obtain a polyarylate having the best color. If the excess is too low, the reaction rates are poor and the color benefits are lost.

The dicarboxylic acid useful in this invention is either isophthalic acid or a mixture of isophthalic acid and terephthalic acid. Thus, broadly the range of isophthalic acid is 20 to 100 mole percent and the range of terephthalic acid is 80 to 0 mole percent. In a preferred embodiment the range of isophthalic acid is 20 to 50 mole percent and the range of terephthalic acid is 80 to 50 mole percent.

The bisphenol useful in this invention is 2,2-bis(4-hydroxyphenyl)propane, typically called bisphenol-A.

The 4-dialkylaminopyridine, acid anhydride, bisphenol-A and dicarboxylic acid can be reacted to form the polyarylate using one or more conventional reaction vessels. Typically, the polyarylate is prepared in one reaction vessel by adding the acid anhydride, bisphenol, dicarboxylic acid and catalyst to the reaction vessel and reacting these materials to form the diester derivative of the dihydric phenol and then subsequently reacting the diester and dicarboxylic acid to form the polymer.

After initially forming the admixture of a 4-dialkylaminopyridine, an acid anhydride, bisphenol-A and a carboxylic acid, the sequential steps of the invention are practiced in order to polymerize the admixture into a polyarylate having a degree of polymerization of at least 50.

The first step comprises subjecting the admixture to a pressure in the range of 500 to 1400 mm of Hg and a temperature in the range of 20° to 150° C. while maintaining a degree of polymerization of substantially 1.0. In a preferred embodiment the first step comprises subjecting the admixture to substantially atmospheric pressure and a temperature in the range of 20° C. to 120° C.

During this step the admixture is thoroughly mixed with some solution and melting of the components taking place. Essentially no chemical reactions take place in this step.

The second step comprises subjecting the admixture to a pressure in the range of 500 to 1400 mm of Hg and a temperature in the range of 285° to 350° C. to achieve an degree of polymerization in the range of 2 to 7. Preferably, the second step comprises subjecting the admixture to substantially atmospheric pressure and a temperature in the range of 290° to 310° C.

During the second step the bisphenol-A is first esterified to form the bisphenol-A diester. This reaction begins at about 140–170° C. as evidenced by free acid evolution. The esterified bisphenol-A subsequently reacts with the dicarboxylic acid. Only low levels of reaction are seen at this point.

The third step comprises subjecting the admixture to a pressure in the range of 100 to 400 mm of Hg and a temperature in the range of 285° to 350° C. to achieve an degree of polymerization in the range of 7 to 15. Preferably, the second step comprises subjecting the admixture to a pressure in the range of 150 to 250 mm of Hg and a temperature in the range of 290° to 310° C.

During the third step the pressure is lowered to aid the removal of liberated acid from the bisphenol-A diester reaction with dicarboxylic acid. The pressure avoids foaming in the final reaction step. Reduced pressure earlier than the third step can lead to sublimation of admixture components.

The fourth step comprises subjecting the admixture to a pressure in the range of 100 to 400 mm of Hg and a temperature in the range of 330° to 400° C. to achieve an degree of polymerization in the range of 7 to 15. Preferably, the fourth step comprises subjecting the admixture to a pressure in the range of 150 to 250 mm of Hg and a temperature in the range of 340° to 360° C.

During the fourth step the temperature is raised to the temperature required to process the final material. Little buildup in the degree of polymerization is seen in this step.

The fifth step comprises subjecting the admixture to a pressure in the range of 10 to 75 mm of Hg and a temperature in the range of 330° to 400° C. to achieve a degree of polymerization of at least 50. Preferably, the fifth comprises subjecting the admixture to a pressure in the range of 25 to 50 mm of Hg and a temperature in the range of 340° to 360° C.

During the fifth step the pressure is lowered to drive the bisphenol-A ester reaction with the carboxylic acid to obtain a degree of polymerization of at least 50. The actual temperature and pressure used are determined by equipment capabilities and requirements to obtain the degree of polymerization.

The times associated with the five steps of the process can vary significantly. Any time can be used as long as the specified degree of polymerization is achieved.

The sequence of steps is an important aspect of this invention. The sequence of five steps must be performed in the described order.

The molecular weight of the polyarylate prepared by the process of this invention are defined by the degree of polymerization. In this invention the term "degree of polymerization" means the average number of divalent radicals contributed by bisphenol-A and dicarboxylic acid which are connected in a single chain.

The degree of polymerization is calculated by the Carrothers equation $$DP = \frac{1}{1-P}$$

where P is the degree of conversion. The degree of conversion is determined by the free acid evolution as compared to the theoritical free acid evolution. The first 50% of theoritical acid evolution is from the esterification of bisphenol-A and does not lead an increase in the degree of polymerization.

The polyarylates prepared by the process of this invention are useful as injection-molding plastics, films, and in blends with other polymers, such as polycarbonates and polyesters.

EXAMPLE 1

An admixture was prepared by adding 45.48 g of terephthalic acid, 15.16 g of isophthalic acid, 83.33 g of bisphenol-A, 89.43 g acetic anhydride (20 mole % excess) and 1.0 ml of dimethylaminopyridine to toluene (0.365 molar) in a 500 ml single necked round bottomed flask equipped with metal stirrer, nitrogen purge and vacuum capabilities.

The five steps of this invention were practiced as follows (1) The flask was placed in a metal bath and the admixture were subjected to a pressure of 740 mm of Hg and a temperature of 120° C. for 15 minutes while maintaining a degree of polymerization of substantially 1.0.

(2) The admixture was then subject to a pressure of 740 mm of Hg and a temperature of 300° C. for 45 minutes to achieve an degree of polymerization in the range of 2 to 7, (3) The admixture was then subject to a pressure of 200 mm of Hg and a temperature of 300° C. for 10 minutes to achieve an degree of polymerization in the range of 7 to 15, (4) The admixture was then subject to a pressure of 200 mm of Hg and a temperature of 360° C. for 20 minutes to achieve an degree of polymerization in the range of 7 to 15, and (5) The admixture was then subject to a pressure of 50 mm of Hg and a temperature of 360° C. for 60 minutes to achieve an degree of polymerization of at least 50.

The polymer was then allowed to cool and was removed from the flask by warming the outside and pulling the solid polymer away from the glass. The degree of polymerization of the polyarylate was more than 50.

We claim:

1. A process for preparation of a polyarylate having a degree of polymerization of at least 50 comprising (A) forming an admixture comprised of 4-dialkylaminopyridine, an acid anhydride prepared from an aliphatic carboxylic acid which contains from 2 to 6 carbon atoms, bisphenol-A and a mixture of isophthalic acid and terephthalic acid wherein the range of isophthalic acid is 20 to 100 mole percent and the range of terephthalic acid is 80 to 0 mole percent, (B) polymerizing the admixture by (1) subjecting the admixture to a pressure in the range of 500 to 1400 mm of Hg and a temperature in the range of 20° to 150° C. while maintaining a degree of polymerization of substantially 1.0, (2) subjecting the admixture to a pressure in the range of 500 to 1400 mm of Hg and a temperature in the range of 285° to 350° C. to achieve an degree of polymerization in the range of 2 to 7, (3) subjecting the admixture to a pressure in the range of 100 to 400 mm of Hg and a temperature in the range of 285° to 350° C. to achieve an degree of polymerization in the range of 7 to 15, (4) subjecting the admixture to a pressure in the range of 100 to 400 mm of Hg and a temperature in the range of 330° to 400° C. to achieve an degree of polymerization in the range of 7 to 15, and (5) subjecting the admixture to a pressure in the range of 10 to 75 mm of Hg and a temperature in the range of 330° to 400° C. to achieve an degree of polymerization of at least 50.

2. A process for preparation of a polyarylate having a degree of polymerization of at least 50 comprising
    (A) forming an admixture comprised of 4-dimethylaminopyridine, acetic anhydride, bisphenol-A and a mixture of isophthalic acid and terephthalic acid wherein the range of isophthalic acid is 20 to 50 mole percent and the range of terephthalic acid is 80 to 50 mole percent,
    (B) polymerizing the admixture by
        (1) subjecting the admixture to substantially atmospheric pressure and a temperature in the range of 20° C. to 120° C. while maintaining a degree of polymerization of substantially 1.0,
        (2) subjecting the admixture to substantially atmospheric pressure and a temperature in the range of 290° to 310° C. to achieve an degree of polymerization in the range of 4 to 6,
        (3) subjecting the admixture to a pressure in the range of 150 to 250 mm of Hg and a temperature in the range of 290° to 310° C. to achieve an degree of polymerization in the range of 8 to 12,
        (4) subjecting the admixture to a pressure in the range of 150 to 250 mm of Hg and a temperature in the range of 340° to 360° C. to achieve an degree of polymerization in the range of 8 to 12, and
        (5) subjecting the admixture to a pressure in the range of 25 to 50 mm of Hg and a temperature in the range of 340° to 360° C. to achieve an degree of polymerization of at least 50.

* * * * *